United States Patent
Jawaharlal et al.

(10) Patent No.: US 10,708,205 B2
(45) Date of Patent: Jul. 7, 2020

(54) METADATA GENERATOR RESPONSIVE TO USER CONTENT

(71) Applicant: INTERNATIONAL BUSINESS MACHINES CORPORATION, Armonk, NY (US)

(72) Inventors: Samuel M. Jawaharlal, Tamil Nadu (IN); Sarbajit K. Rakshit, Kolkata (IN); Sathya Santhar, Ramapuram (IN); Balamurugaramanathan Sivaramalingam, Paramakudi (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/794,297

(22) Filed: Oct. 26, 2017

(65) Prior Publication Data
US 2019/0132270 A1  May 2, 2019

(51) Int. Cl.
| | | |
|---|---|---|
| H04L 12/58 | (2006.01) | |
| G06F 16/22 | (2019.01) | |
| G06F 16/2457 | (2019.01) | |
| H04L 29/08 | (2006.01) | |

(52) U.S. Cl.
CPC .......... *H04L 51/08* (2013.01); *G06F 16/2228* (2019.01); *G06F 16/24575* (2019.01); *H04L 67/10* (2013.01)

(58) Field of Classification Search
CPC . H04L 51/08; G06F 16/2228; G06F 16/24575
See application file for complete search history.

(56) References Cited

U.S. PATENT DOCUMENTS

| | | |
|---|---|---|
| 5,377,354 A | 12/1994 | Scannell et al. |
| 7,027,463 B2 | 4/2006 | Mathew et al. |
| 8,612,463 B2 | 12/2013 | Brdiczka et al. |

(Continued)

FOREIGN PATENT DOCUMENTS

WO   WO2004053847 A2   6/2004

OTHER PUBLICATIONS

Peter Mell et al, The NIST Definition of Cloud Computing, National Institute of Standards and Technology, Publication 800-145, 2011.

(Continued)

*Primary Examiner* — Nasser M Goodarzi
*Assistant Examiner* — Adil Ocak
(74) *Attorney, Agent, or Firm* — Patrick J. Daugherty; Daugherty & Del Zoppo Co. LPA (57) ABSTRACT

Aspect include configured computer device processor that determine unstructured context data for a user processing an electronic message, the unstructured personal context data one or more of user motion data, user biometric data, environmental conditions of the user and audio speech data. The configured processors further determine a structured metadata value that is descriptive of a context of the user from the unstructured context data and is one or more of an emotional state value, a type of a vocal utterance and a user physical condition. The configured processors also incorporate the determined structured metadata value within a data structure defining the electronic message, and forward the determined structured metadata value to a recipient of the electronic message.

20 Claims, 5 Drawing Sheets

(56) References Cited

U.S. PATENT DOCUMENTS

| | | |
|---|---|---|
| 9,400,662 B2 | 7/2016 | Rupp et al. |
| 2002/0120702 A1 | 8/2002 | Schiavone et al. |
| 2005/0058261 A1 | 3/2005 | Baumard |
| 2007/0043687 A1 | 2/2007 | Bodart et al. |
| 2015/0277560 A1* | 10/2015 | Beaty .................. G06F 3/015 345/156 |
| 2017/0056722 A1* | 3/2017 | Singh .................. G06F 1/26 |
| 2017/0221336 A1* | 8/2017 | Ogaz .................. G08B 21/0423 |

OTHER PUBLICATIONS

Laura A. Dabbish et al, Understanding Email Use: Predicting Action on a Message, Human-Computer Interaction Institute School of Computer Science, Carnegie Mellon University, ACM, 2005.

Jennifer Kite-Powell, The Wearble Evolution Debut at CES 2016, Forbes, 2016.

Iona Tan, New Smartwatch Measures Emotions, Autism News, autism and science, science and tech, ICare4Autism, 2017.

Rosalind Picard, Surprises from a Smartwatch Designed to Sense Emotion, MIT, SBS Seoul Digital Forum, 2015.

Irena Koprinska et al, Learning to Classify E-mail, School of Information Technologies, The University of Sydney, 2007.

\* cited by examiner

FIG. 6

METADATA GENERATOR RESPONSIVE TO USER CONTENT

BACKGROUND

An individual may use a wide variety of different device platforms to create, receive and respond to emails, simple message system (SMS) and other electronic format messages, including computers (desktops, laptops, tablets) smart phones and accessories thereof (smart "watches," wireless headsets and headphones, etc.). While this enables a user to engage in and maintain a conversation of related messages by using a variety of different devices, such freedoms may add complexities to tracking and searching for historic message activity. For example, use of subject terms may be inconsistent, or missing, across related messages that span different devices or application platforms, wherein a reply to an email having certain unique subject line data may be sent via a text message application that does not have subject line data fields, and therefore a subject line data search for all messages across different platforms or devices will not find the text message.

SUMMARY

In one aspect of the present invention, a computerized method for selectively associating user context metadata with electronic messages includes executing steps on a computer processor. Thus, a computer processor is configured to determine unstructured context data for a user processing an electronic message, the unstructured personal context data one or more of user motion data, user biometric data, environmental conditions of the user and audio speech data. The configured processor further determines a structured metadata value that is descriptive of a context of the user from the unstructured context data and is one or more of an emotional state value, a type of a vocal utterance and a user physical condition. The configured processor incorporates the determined structured metadata value within a data structure defining the electronic message, and forward the determined structured metadata value to a recipient of the electronic message.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine unstructured context data for a user processing an electronic message, the unstructured personal context data one or more of user motion data, user biometric data, environmental conditions of the user and audio speech data. The configured processor further determines a structured metadata value that is descriptive of a context of the user from the unstructured context data and is one or more of an emotional state value, a type of a vocal utterance and a user physical condition. The configured processor incorporates the determined structured metadata value within a data structure defining the electronic message, and forward the determined structured metadata value to a recipient of the electronic message.

In another aspect, a computer program product for selectively associating user context metadata with electronic messages has a computer-readable storage medium with computer readable program code embodied therewith. The computer readable hardware medium is not a transitory signal per se. The computer readable program code includes instructions for execution which cause the processor to determine unstructured context data for a user processing an electronic message, the unstructured personal context data one or more of user motion data, user biometric data, environmental conditions of the user and audio speech data. The configured processor further determines a structured metadata value that is descriptive of a context of the user from the unstructured context data and is one or more of an emotional state value, a type of a vocal utterance and a user physical condition. The configured processor incorporates the determined structured metadata value within a data structure defining the electronic message, and forward the determined structured metadata value to a recipient of the electronic message.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
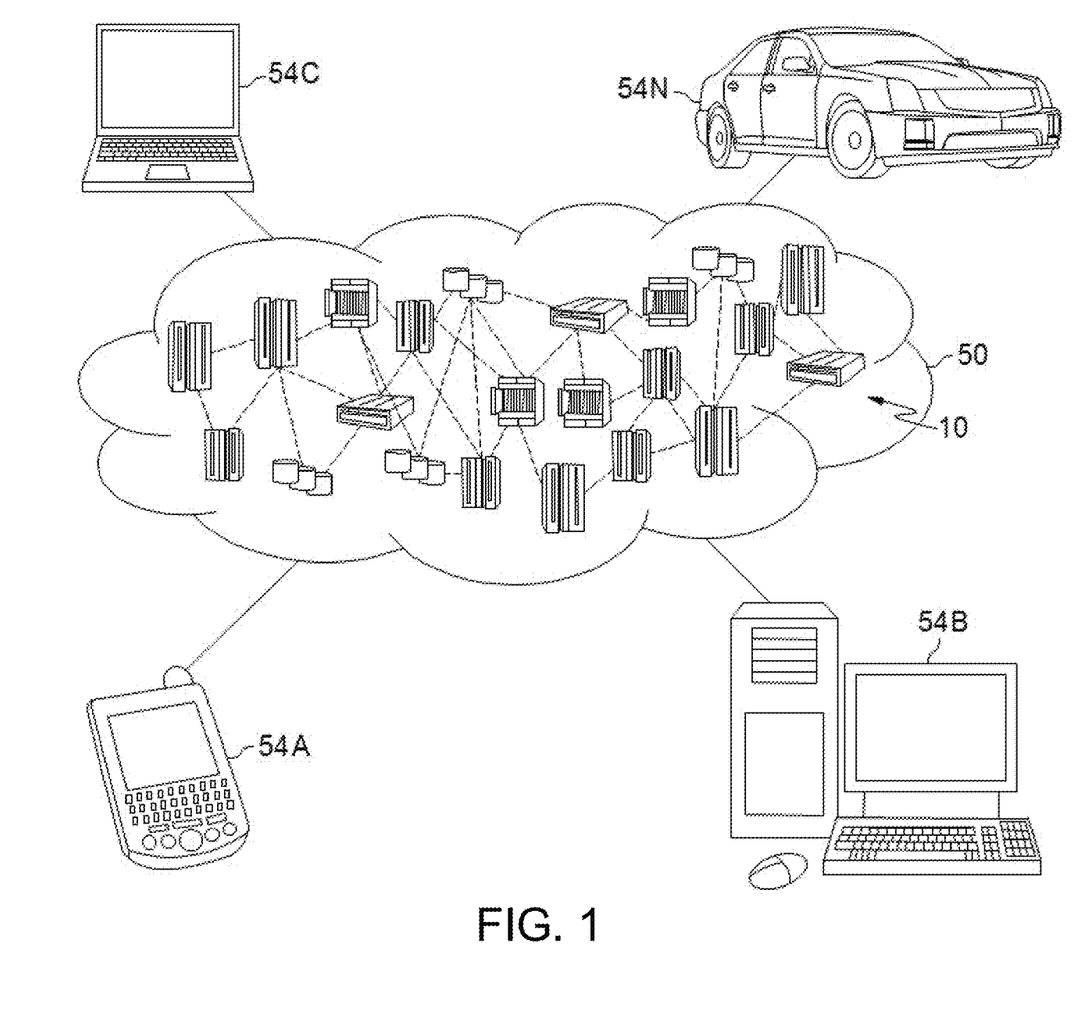
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
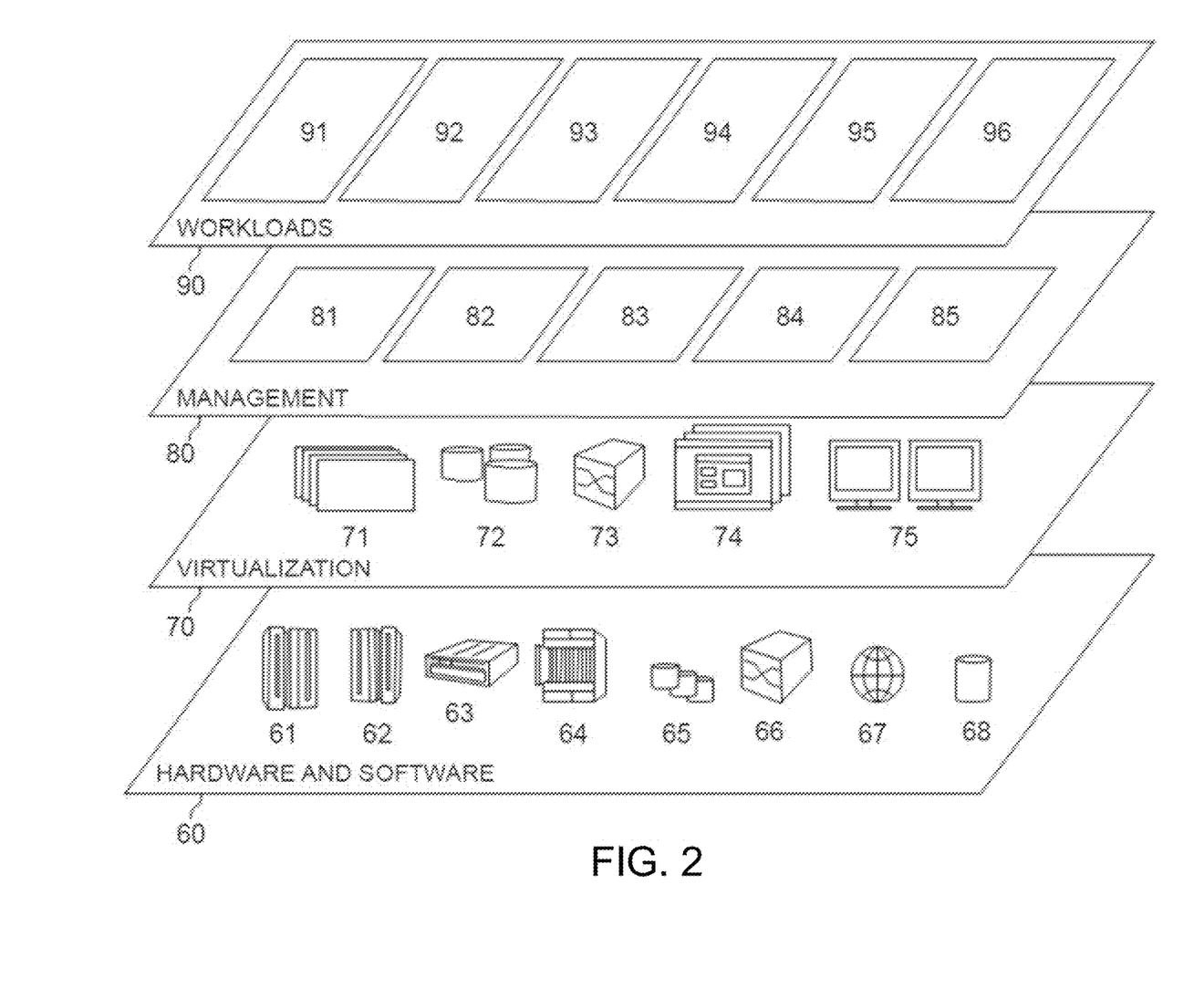
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for selectively associating user context metadata with electronic messages 96.

Figure 3:
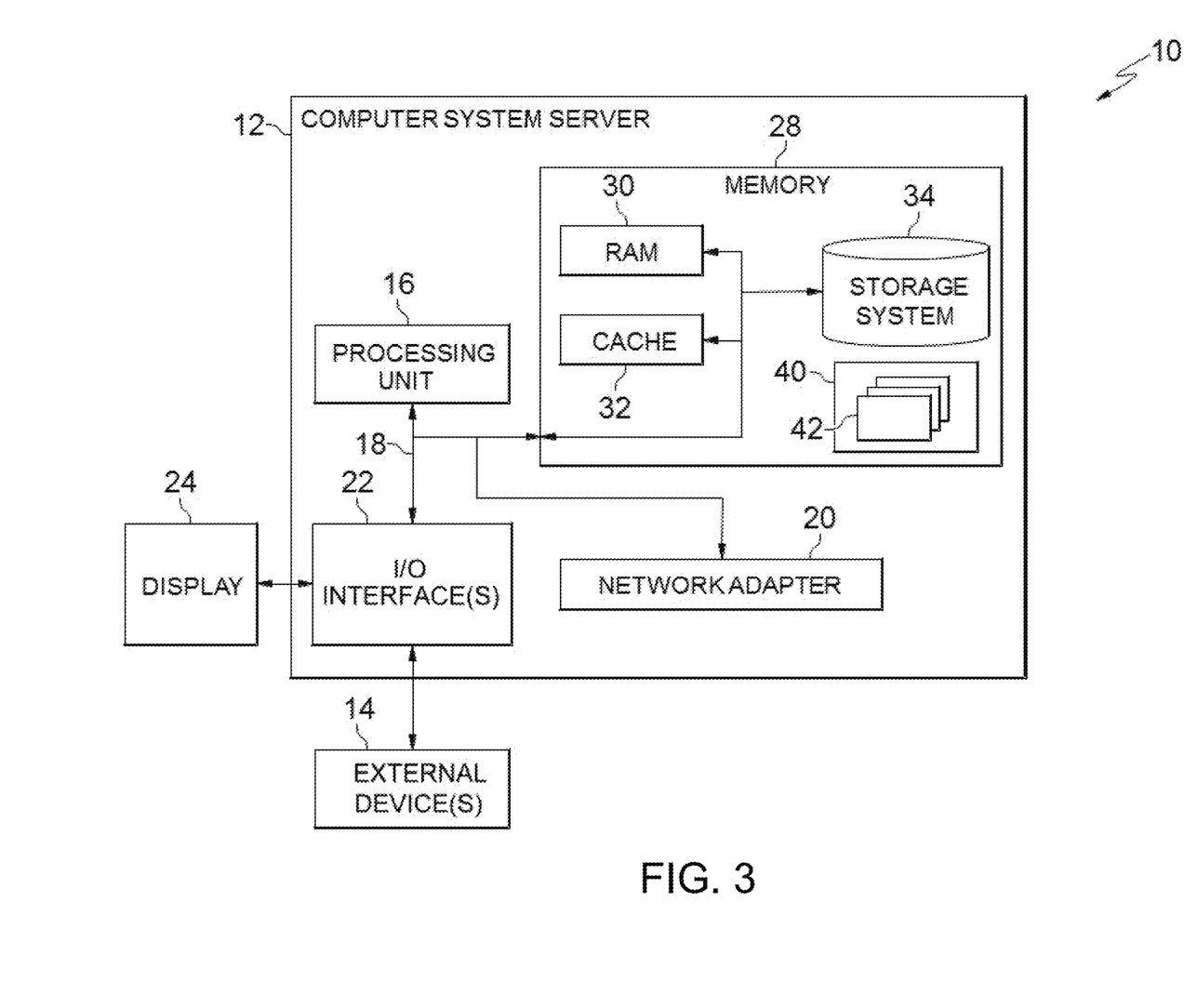
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
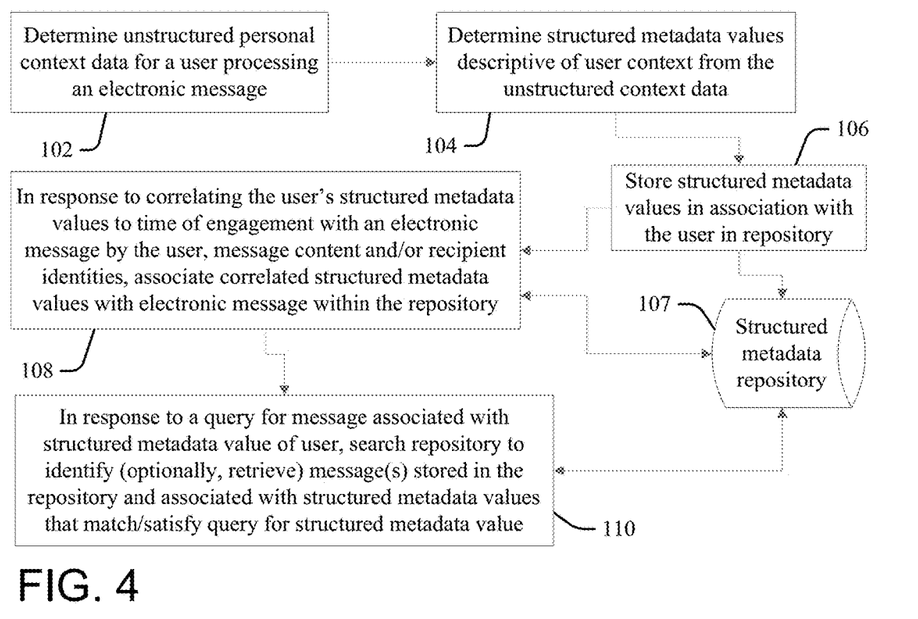
FIG. 4 is a flow chart illustration of an embodiment of the present invention.

FIG. 4 illustrates a process or system according to the present invention for selectively associating user context metadata with electronic messages. At 102 a processor of a computerized device that is configured according to an aspect of the present invention (the "configured processor") captures or determines unstructured personal context data for a user processing an electronic message via the processor, thus utilizing (wearing, holding, operating, etc.) the device. For example, the configured processor uses cellular location or global positioning satellite (GPS) device data, microphones, cameras, motion detectors, thermometers, accelerometers, personal fitness trackers and other devices of or in communication with a smart phone or other mobile computerized device of the configured processor to acquire unstructured physical attribute data of the user or of his or her environment, or of others with the user. Illustrative but not limiting or exhaustive examples of the unstructured physical attribute data include general motion and gesture data of the device or user; personal biometrics of the user (body temperature, blood pressure, respiration rate, etc.) or others with the user; general environmental conditions and temperatures, and/or geographic location of the device or user; audio data generated by speaking, utterances and physical movements of the user and others with the user or engaging the user in conversation (including remotely via electrical voice communication devices, such a phones, Voice-over-Internet Protocol (VoIP) packet communications, etc.).

At 104 the configured processor determines structured metadata values with respect to the user or of a physical context, environmental context of the user from the unstructured context data acquired at 102. Illustrative but not limiting or exhaustive examples of the determined structured metadata values include textual subject matter data derived from speech-to-text processing of audio data; geographic locations of the user or the device determined from GPS or other unstructured location data; an emotional state indicator of the user indicated by a type of a vocal utterance (laughter, coughing, crying, shouting, etc.) determined to be within the audio data generated by the user and others with the user, or via analysis of audio vocalization quality (identifying argument audio data from stridency, shouting volumes, angry or other vocal tones, etc.); a physical condition or state of health or well-being indicator of the user or others in communication with the user, such as determining that the user or others have a cold or are otherwise ill via processing personal biometric data or recognizing coughing within the audio data; emotions, activities, gestures and other physical body conditions and contexts of the user or others may also be determined.

Smart devices (smart watches, smart phones, fitness trackers, etc.) are capable and enabled to listen in and store unstructured data at 102 during user conversations and discussion, are used as inputs of collected unstructured information that is later converted to structured metadata at 104. The structured metadata values generally comprehend values indicative of a physical state, activity and/or environmental context of the user or others with the user.

Physical activities of the users or others may also be determined as structured metadata values by the configured processor at 104 from the data inputs, for example from motion detectors, thermometers, accelerometers, personal fitness trackers and GPS location data. Thus the configured processor may determine at 104 that the user is jogging with others from rate of speed and geolocation of the user on pathways or within areas appropriate for jogging, or on a treadmill from sensor and/or treadmill device data; swimming, power boating or sailing (such as indicated from audio data of an outboard motor, or sails flapping in the wind), as indicated by geolocation data indicating that the user is on a body of water, and consistent with device accelerometer and motion data. Bicycling activities may be determined via rate of movement that is elevated speed relative to a walking speed, in combination with a range of movement of the device that indicates that the user is seated on a bike seat and not jogging. Hiking structured metadata values may be determined from movement data located along a park trail at a walking pace.

Social activity structured metadata values may be recognized by the configured processor at 104, such as a value indicating a meeting over coffee, lunch or dinner, etc., with others detected within the presence of the user (or from check-in or other co-location data of the others) over a specific or threshold time period at a restaurant or coffee shop identified by geolocation or social media "check-in" location data that is during lunch or dinner or other business hours.

Still other structured metadata value determinations by the configured processor at 104 will be apparent to one skilled in the art At 106 the configured processor stores the structured metadata values in association with the user in a structured metadata repository 107 (computer memory device, cloud storage device or service, etc.) in association with temporal times of the base unstructured data, and with identity data of the user and of the others with the user at the time of acquisition (for example, others generating audio data at that time in conversation with the user.

At 108, in response to correlating or matching the determined structured metadata values stored for the user in the repository 107 to a time of engagement with an electronic message by the user (composing, reading, opening, forwarding or otherwise processing an email chat, text or other message), message content, and/or recipient identities of the electronic message, the configured processor associates the correlated structured metadata values with the user's electronic message within the repository 107.

At 110, in response to a query for a message associated with a structured metadata value of the user that is contemporaneous with or otherwise relevant to the user and an electronic message (for example, descriptive of a physical state or action by the user during composition, sending, receiving or reading a message), the configured processor searches the repository 107 to identify (optionally, to retrieve) message stored in the repository 107 that are associated with structured metadata values that match or otherwise satisfy the query for the specific structured metadata value.

Thus, aspects of the present invention enable a user to extend the management and retrieval of messages beyond typical message data attribute values (recipient or sender identity, subject or text content, temporal data (time and date) of reception or sending, etc.) to determined structured metadata values of a context of the message that may be entirely independent and unrelated to the message attribute values. More particularly, in a meeting with other people a smart phone of a first user ("User A") records contemporaneous audio data that includes laughter, and/or acquire biometric data of the user that includes high temperature or fever-indicating metrics, aspects of the present invention generate structured meta-data associated with the meeting as to who's at the meeting, user physical attributes, etc. After the meeting, User A creates and send an email regarding the subject of the meeting or somehow related to the meeting to a recipient who was in that associated meeting ("User B"). Aspects recognize the relationship of the email to the structured data (at 108, FIG. 4) and associate the structured metadata of the meeting with the email.

To find that email under the prior art, User A needs to remember the sender/recipient, the subject, or some other content item that is searchable. However, what if User A cannot remember any of the searchable content items accurately, sufficiently enough to find the email during the search? If User A remembers that the email was related to the meeting with other people, and that he or she laughed at the meeting, or was feverish or sick at the meeting, or cried, or that the people at the meeting were talking about a specific sporting event, User A can user aspects of the present invention to search for that meta-data which has been associated to the email itself, and thereby find the email.

For example, a user may query at 110 for retrieval of all emails received in the last one month which made the user laugh, and/or also a certain other user in the company of the user, wherein the configured processor retrieves (FIG. 4 at 110) each message received over the specified one-month time frame that are associated with contemporaneous determined structured metadata values that indicate that the users were each laughing (for example, while they were together, or on a telephone conversation) while one was reading email messages to the other. Such contemporaneous structured metadata may have been generated from audio data recorded by the cell phone of user A (FIG. 4 at 102) that is contemporaneous (within a threshold period of time) to data indicating that user A received or opened/read the message, wherein processing of the data into structured data (FIG. 4 at 104) identifies portions of laughter generated by each of user A and user B within the audio data, and said laughter determinations were associated with the messages in the repository (FIG. 4 at 108) that were contemporaneous in time, or contain text content that matches text content within the audio data containing the laughter (such as a subject line or subject matter, etc.).

In another example, User A may recall that he sent a message to User B some time in the last year when User A had a severe cold (as User A could not speak clearly on a voice line due to congestion, sore throat, etc., so felt compelled to convey information to User B in an email message), but User A cannot accurately recall conventional indicia used in the prior art to search for the message (exact or distinguishing subject matter content, time and date, other recipients of the message, etc.). Aspects of the present invention enable User A to search for all emails that he or she sent to User B when (contemporaneous with a time) User A had a fever or sever congestion as determined from unstructured biometric data or audio vocal data captured (FIG. 4 at 102) by a smart phone of User A used for sending the email message.

In still another example, User A may query for all emails associated with structured metadata that meets the following conditions: (i) they were discussed with four other people, Users B, C, D, and E (as reflected by audio data captured by a smart phone that is processed to identify the presence of the other people); (ii) during a meeting at geographic location X (as determined from smart phone location data); AND (iii) when User A was ill with a cold (as determined from user biometric data, or audio data capturing user A coughing or stating "I have the worst cold" or similar content converted to text from audio data). Thus, though User A may not be able to recall or identify text content or specific temporal data of the message, unlike the prior art, the present aspect can find the message or message as a function of searchable values of the appropriate, contemporaneous determined structured metadata values associated therewith (FIG. 4 at 108) that may be entirely independent of the subject matter content of the messages.

Figure 5:
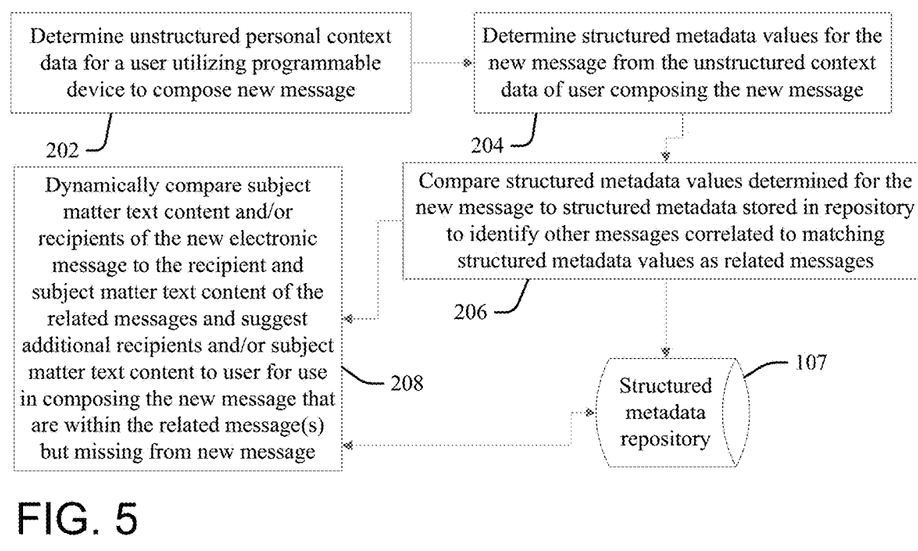
FIG. 5 is a flow chart illustration of an alternative embodiment of the present invention.

FIG. 5 illustrates another embodiment of an aspect of the present invention wherein a processor of a computerized device that is configured according to an aspect of the present invention (the "configured processor") at 202 determines unstructured personal context data for a user utilizing the device in composing a new message (email, text, chat, etc.), such as (inclusive of) the unstructured personal context data determined at 102 of the embodiment of FIG. 4 described above.

At 204 the configured processor determines structured metadata values for the new message under composition with respect to the user (physical and/or environmental context of composing user) from the unstructured context data acquired at 202, such as (inclusive of) the structured metadata values determined at 104 of the embodiment of FIG. 4 described above.

At 206 the configured processor compares the structured metadata values determined for the new message under composition to structured metadata stored in the repository 107 to identify one or more other messages that are correlated to matching structured metadata values within the repository as related messages.

At 208 the configured processor compares the subject matter text content and/or recipients of the new electronic message under composition to the recipient and subject matter text content of the related messages on a dynamic basis, and suggests additional recipients and/or subject matter text content to the user for use in composing the new message that are within the related message(s) but missing from the new message under composition. For example, with each keystroke or character entry or recipient addition by the user composing the message the process iterative repeats suggestions found by comparison to the other messages. The suggestions may be "auto-complete" items populated within recipient address or message content fields, wherein selection of the items by the user via a cursor or other graphic user interface (GUI) routine results in acceptance of the populated item into the message, and still other appropriate techniques will be apparent to one skilled in the art.

Thus, at 208 the configured suggests additional recipients and/or message text content that are missing from the new message from the related messages correlated (associated) with the structured metadata values determined for the user composing the new electronic message. While the prior art may make suggestions from other messages as a function of matching recipient or subject matter content data, aspects of the present invention extend such suggestions to comprehend recipients and content of messages that do not match either recipient or content data of the current message. The aspects thereby bring in suggestions from messages that are apparently unrelated under prior art techniques, due to differences in recipient or subject matter content, and thus that would not be used for suggestions in the prior art, as a function of recognizing commonalities instead of the structured metadata values correlated within the repository 107. For example, at 208 the configured processor may suggest additional friend or family member recipients and content from other messages correlated with crying or illness conditions of the user composing the new message (optionally, of those composed during a same hour or day or other time period), wherein the user also sent messages to said other recipients or with the other subject matter content historically when the user was upset or crying or ill, etc.

Aspects further synchronize structured metadata values correlated with electronic messages to related messages within a chain of messages (replies, forwarded messages, read message notifications, etc.), wherein the related messages each carry structured metadata values, in some examples depending on meeting boundary rules and conditions. Aspects correlate structured metadata across different client nodes, and may utilize processing rules to differentiate actions across different situations, including replicating metadata to a message from a source node to another node where metadata does not exist where users of the nodes are part of (related to) the same structured metadata, or are recipients of a message but not part of the structured metadata associated therewith, etc.

Figure 6:
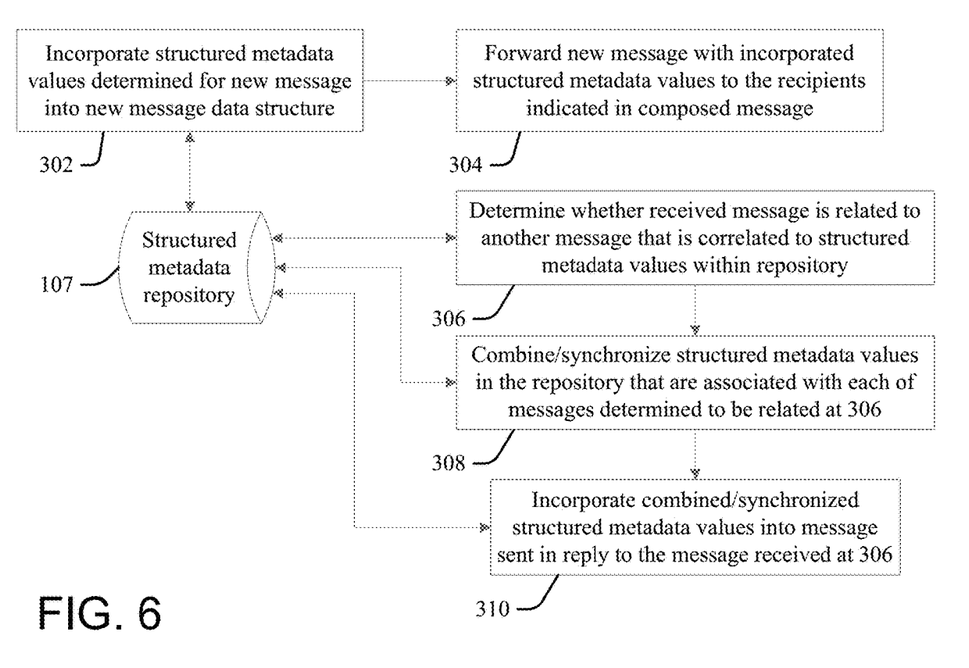
FIG. 6 is a flow chart illustration of an alternative embodiment of the present invention.

For example, FIG. 6 illustrates another embodiment of an aspect of the present invention wherein a processor of a computerized device that is configured according to an aspect of the present invention (the "configured processor") at 302 incorporates the structured metadata values determined for a new message (such as at 204, FIG. 5) into the data packets or structures defining the new message, and at 304 forwards the new message with the incorporated structured metadata values to the recipients indicated in the composed message (via an appropriate messaging system).

At 306, in response to receiving a message for a (first) receiving user from another, different (second) sending user, the configured processor determines whether the received message is related to another, previous message of the first user that is correlated to structured metadata values with the repository 107: for example, whether it is a reply to the previous message, a forwarded message from a chain including the previous message, or a read message notification for receipt of the previous message, and still other relationship criteria may be considered and applied.

At 308 the configured processor combines or otherwise synchronizes structured metadata values in the repository 107 that are associated with each of the messages determined to be related at 306.

At 310 the configured processor incorporates the combined/synchronized structured metadata values into a reply message composed and sent by the user in reply to the message received at 306.

In one example a "Sender S" sends an email to "Recipient R" that was at a meeting, wherein a device aspect according to the present invention of Sender S acquires unstructured data from the meeting, generates structured metadata therefrom and associates said structured metadata with the email. Recipient R includes Sender S as a recipient of a reply message or forwarding of the email to another "Recipient C," via use of a smart phone or other device having unstructured metadata acquisition and structured metadata generation capabilities, and accordingly with additional structured metadata generated by the device of Recipient R. When the device of Sender S receives this message from Recipient R, the device of Sender S syncs the structured metadata of the original message and the reply message: for example, concatenating or otherwise combining the structured metadata of the different messages.

Aspects may also incorporate filters or other controls in selectively combining, synchronizing and forwarding structured metadata values with messages to recipients. For example, some aspects determine a privacy level of the structured metadata values (including at 302, 304, 308 and/or 310 of FIG. 6), and only incorporate or send/forward the structured metadata values in the email if the designated recipient meets the privacy level of the structured metadata values. Accordingly, structured metadata values regarding the personal health or expressions of the sending user (illness, laughter, etc.) may be graded or otherwise determined to be personal metadata of the user, wherein incorporation of said personal structured metadata values into a message for forwarding to a recipient is limited to recipients that are determined to be friends, family or other personal contacts, and wherein the personal metadata is not incorporated in the data structures of messages to business, school or other professional or general-public contacts of the user. Users can configure certain metadata parameters as private (high temperature, etc.) so that it will not be synced with messages to all recipients by an email client/server.

Aspects of the present invention may associate the structured metadata values with any of a variety of related messages (new, reply, forwarded, etc.) corresponding to a same message or mail thread or chain, wherein each of the related message may carry metadata and have metadata synchronized, depending on meeting filters and other conditional rules. For example, a given "User X" that is a recipient of a message that is part of a conversation set of related messages may use a computerized device that is not a smart phone or other device configured to capture/determine unstructured personal context data in drafting the reply message (at 102, FIG. 4) to draft and send a reply message to another person within the conversation, "User Y." Hence, the message from User X will not have any structured metadata derived from unstructured personal context data (at 104, FIG. 4) to incorporate within the message.

However, where User Y uses the processes of FIG. 6, a message received in reply from User Y may include structured metadata generated by User Y and incorporated within the reply message in the conversation set of messages, wherein a configured processor of aspects of the present invention synch said structured metadata to each message from User Y before it is sent out to other recipients within the conversation chain. This enables User X to use the synched structured metadata to search for messages within the conversation set, extending the structured metadata searching attributes to other users within a conversation or other set of related messages that do not have structured metadata generation and association capabilities with respect to their own messages. User X is thereby enabled to search and find the original message in response to a query for structured metadata relative to the other, replying User Y. For example, if User X recalls that User Y was ill when they had a message exchange, or had indicated that he found the email from User X very humorous and "laughed out loud," User X may search for all emails exchanged with User Y when User Y had a high fever, or that made User Y laugh, wherein (assuming User X has permission to receive or search this type of personal structured metadata for User Y) User X may find the conversation emails that are synched with the structured metadata provided from messages received from User Y.

Synchronizing structured metadata across different messages at 308 may be dependent on message relational attributes. For example, a sender may send a message with associated structured metadata to a recipient using a device according to the present invention that also generates and associates structured metadata of the recipient to each reply message, wherein the recipient is involved with different and unique groupings of conversation sets of messages with other senders and recipients. Aspects may limit synchronization to conversation-specific groupings, wherein different structured metadata is associated and synched to each different conversation. In such cases, when a sender sends a reply/forward message that is linked to a given email, the configured processor may ignore synchronization in response to determining that less than all of the recipients or senders are in common; alternatively, it may create a different structured metadata set for each unique grouping of recipients and senders, and synch structured metadata only within each of the unique groupings based on commonality of recipients/senders, and/or subject matter content, etc. Conversation-dependent synching at 308 may also prevent synchronization in response to determining that a recipient is not part of a conversation including messages with embedded structured metadata, and that the recipient does not have unstructured metadata gathering capabilities (is not using an appropriate smart phone, etc.).

Aspects of the present invention may configure mail servers and mail clients to perform auto-synching of metadata across multiple nodes (at 308) in the background, as a function of mail identification and/or thread identification indicia and independent of any actions by users (for example, replying to an email, opening or reading an email in a message thread, etc.). Such aspects further enable users to search for unread messages associated with structured metadata generated by other users, including users who do not have smart devices to capture such contextual information.

Combining or synchronizing structured metadata values in the repository that are associated with each of messages determined to be related (at 308, FIG. 6) may also be dependent recipient groupings or other grouping criteria. For example, if a server processor configured according to the present invention finds that location, time and other attributes of metadata matches across all recipients, the configured processor may determine to omit combining, synchronizing or uploading structured metadata received from a new message from the group, in part as it is therefore likely that attributes of the structured metadata to be uploaded from the new message are duplicitous with respect to structured metadata already associated to messages within the conversation grouping. Alternatively, if only a subset of the senders/recipients within a conversation thread of message have matching metadata attributes or value, the configured processor may skip synchronizing the structured metadata for the messages of the matching subset and only update the structured metadata associated with the messages of the remaining others of the senders/recipients within the conversation thread; such aspects assure consistent structured metadata associations to messages of each participant of said conversation thread.

Thus, aspects may selectively combine or associate structured metadata as a function of recipient or sender identity: for example, only in association emails to recipients who were in an original meeting or conversation from which structured metadata is generated and associated to an email creation, wherein said structured metadata is not sent out with the same email to any other recipients, or to general-public recipients. Similarly, the combination of received message structured metadata by a recipient with the structured metadata of other messages may be dependent on the attendance of the recipient at the original meeting (if not, then the received structured metadata is not combined or synched to other structured metadata associated with the recipient.

Aspects may automatically identify messages for association to structured metadata as a function of message content searching and analysis: for example, associating to each message of a group of messages have common values as to meeting participants and subject matter content within the subject line or message body that matches subject matter discussed in the meeting (for example, as represented in the structured metadata via speech-to-text transformation of unstructured audio data). Where structured metadata generated from multiple, different meetings share a subject matter or recipient commonality, aspect devices may link the structured metadata of each of the meetings to a message email, or choose only those most likely to be directly related to the message (those having a highest likelihood of being correctly associated with the message.

Thus, aspects according to the present invention analyze, associate and update structured metadata built from contextual and cognitive analysis of smart device inputs, providing data that is independent of actual message content and recipient identities and useful in managing message searching and composition processes associated with message reply, forwarding, invitation, new mail creation and other user actions.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively associating user context metadata with electronic messages, the method comprising executing on a computer processor:

determining unstructured personal context data for a person associated with an electronic message, wherein the unstructured personal context data is selected from the group consisting of: user motion data, user biometric data, environmental conditions of the user, and audio speech data;

determining from the unstructured personal context data a structured metadata value that is descriptive of a context of the person associated with the electronic message that is selected from the group consisting of: an emotional state value, a type of a vocal utterance, and a user physical condition;

incorporating the determined structured metadata value as metadata within a data structure defining the electronic message;

storing, in a data repository, the data structure defining the electronic message in association with a time of acquisition of the unstructured personal context data, identity data of the person associated with the electronic message, and identity data of another person, wherein the person associated with the electronic message and the another person are selected from the group consisting of: a user taking action on the electronic message, a person engaging in audible conversation with the user taking action on the electronic message, a sender of the electronic message, and a recipient of the electronic message; and forwarding the data structure with the incorporated structured metadata value descriptive of a context of the user taking action on the electronic message and defining the electronic message to the recipient of the electronic message.

2. The method of claim 1, wherein the type of the vocal utterance is selected from the group consisting of: laughter, crying, shouting and arguing;
   wherein the user taking action on the electronic message is selected from a group consisting of: composing the electronic message, reading the electronic message, opening the electronic message, sending the electronic message, receiving the electronic message and forwarding the electronic message; and
   wherein the electronic message comprises text content.

3. The method of claim 1, wherein the user physical condition is selected from the group consisting of an illness and a physical activity.

4. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining the unstructured context data, the determining the structured metadata value, the incorporating the determined structured metadata value with the data structure defining the electronic message, the storing in the data repository the data structure defining the electronic message and the forwarding the data structure defining the electronic message to the recipient of the electronic message.

5. The method of claim 4, wherein the computer-readable program code is provided as a service in a cloud environment.

6. The method of claim 1, further comprising:
   in response to a query of electronic messages stored in the data repository with a parameter of the query comprising the determined structured metadata value, the identity data of the person associated with the electronic message and the identity data of the another person, retrieving the electronic message from the data repository in satisfaction of the query as a function of an association of the determined structured metadata value in the data repository with the electronic message, the identity data of the person associated with the electronic message and the identity data of the another person.

7. The method of claim 1, further comprising:
   comparing the determined structured metadata value to structured metadata values associated with electronic messages stored in the data repository; and
   returning a second electronic message from the data repository associated with a second structured metadata value within the data repository and the second structured metadata value matches the determined structured metadata value from a query, and the returned second electronic message according to the second structured metadata value is in satisfaction of the query.

8. The method of claim 7, further comprising:
   comparing content of the electronic message to content of the returned second message and identifying content in the returned second message absent in the content of the electronic message; and
   suggesting the identified content absent from the electronic message and present in the returned second message for incorporation into content of the electronic message,
   wherein the suggested identified content is selected from the group consisting of: a recipient address, and subject matter text content from the returned second message.

9. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   determines unstructured personal context data for a person associated with an electronic message, wherein the unstructured personal context data is selected from the group consisting of: user motion data, user biometric data, environmental conditions of the user, and audio speech data;
   determines from the unstructured personal context data a structured metadata value that is descriptive of a context of the person associated with the electronic message and that is selected from the group consisting of: an emotional state value, a type of a vocal utterance, and a user physical condition;
   incorporates the determined structured metadata value as metadata within a data structure defining the electronic message;
   store in a data repository the data structure defining the electronic message in association with a time of acquisition of the unstructured personal context data, identity data of the person associated with the electronic message, and identity data of another person, wherein the person associated with the electronic message and the another person are selected from the group consisting of: a user taking action on the electronic message, a person engaging in audible conversation with the user taking action on the electronic message, a sender of the electronic message, and a recipient of the electronic message; and
   forwards the data structure with the determined structured metadata value descriptive of a context of the user taking action on the electronic message to the recipient of the electronic message.

10. The system of claim 9, wherein the type of the vocal utterance is selected from the group consisting of laughter, crying, shouting and arguing.

11. The system of claim 9, wherein the user physical condition is selected from the group consisting of an illness and a physical activity.

12. The system of claim 9, wherein the processor executes the program instructions stored on the computer-readable storage medium via the computer readable memory and thereby:
   in response to a query of electronic messages stored in the data repository with a parameter of the query comprising the determined structured metadata value, the identity data of the person associated with the electronic message and the identity data of the another person, retrieves the electronic message from the data repository in satisfaction of the query as a function of an association of the determined structured metadata value in the data repository with the electronic message, the identity data of the person associated with the electronic message and the identity data of the another person.

13. The system of claim 9, wherein the processor executes the program instructions stored on the computer-readable storage medium via the computer readable memory and thereby:
 compares the determined structured metadata value to structured metadata values associated with electronic messages stored in the data repository; and
 returns a second electronic message from the data repository associated with a second structured metadata value within the data repository and the second metadata value matches the determined structured metadata value from the query, and the returned second electronic message according to the second structured metadata value is in satisfaction of the query.

14. The system of claim 13, wherein the processor executes the program instructions stored on the computer-readable storage medium via the computer readable memory and thereby:
 compares content of the electronic message to content of the returned second message and identifies content in the returned second message absent in the content of the electronic message; and
 suggests the identified content absent from the electronic message and present in the returned second message for incorporation into content of the electronic message; and
 wherein the suggested identified content is selected from the group consisting of: a message recipient address, and subject matter text content from the returned second message.

15. A computer program product for selectively associating user context metadata with electronic messages, the computer program product comprising:
 a computer readable storage medium having computer readable program code embodied therewith, wherein the computer readable storage medium is not a transitory signal per se, the computer readable program code comprising instructions for execution by a processor that cause the processor to:
 determine unstructured personal context data for a person associated with an electronic message, wherein the unstructured personal context data is selected from the group consisting of: user motion data, user biometric data, environmental conditions of the user, and audio speech data;
 determine from the unstructured personal context data a structured metadata value that is descriptive of a context of the person associated with the electronic message and that is selected from the group consisting of an emotional state value, a type of a vocal utterance, and a user physical condition;
 incorporate the determined structured metadata value as metadata within a data structure defining the electronic message;
 store in a data repository the data structure defining the electronic message in association with a time of acquisition of the unstructured personal context data, identity data of the person associated with the electronic message, and identity data of another person, wherein the person associated with the electronic message and the another person are selected from the group consisting of: a user taking action on the electronic message, a person engaging in audible conversation with the user taking action on the electronic message, a sender of the electronic message, and a recipient of the electronic message; and
 forward the data structure with the determined structured metadata value descriptive of a context of the user taking action the electronic message to the recipient of the electronic message.

16. The computer program product of claim 15, wherein the type of the vocal utterance is selected from the group consisting of laughter, crying, shouting and arguing.

17. The computer program product of claim 15, wherein the user physical condition is selected from the group consisting of an illness and a physical activity.

18. The computer program product of claim 15, wherein the computer readable program code instructions for execution by the processor further cause the processor to:
 in response to a query of electronic messages stored in the data repository with a parameter of the query comprising the determined structured metadata value, the identity data of the person associated with the electronic message and the identity data of the another person, retrieve the electronic message from the data repository in satisfaction of the query as a function of an association of the determined structured metadata value in the data repository with the electronic message, the identity data of the person associated with the electronic message and the identity data of the another person.

19. The computer program product of claim 15, wherein the computer readable program code instructions for execution by the processor further cause the processor to:
 compare the determined structured metadata value to structured metadata values associated with electronic messages stored in the data repository; and
 return a second electronic message from the data repository associated with a second structured metadata value within the data repository and the second metadata value matches the determined structured metadata value from the query, and the returned second electronic message according to the second structured metadata value is in satisfaction of the query.

20. The computer program product of claim 19, wherein the computer readable program code instructions for execution by the processor further cause the processor to:
 compare content of the electronic message to content of the returned second message and identify content in the returned second message absent in the content of the electronic message; and
 suggest the identified content absent from the electronic message and present in the returned second message for incorporation into the electronic message; and
 wherein the suggested identified content is selected from the group consisting of: a message recipient address, and subject matter text content from the returned second message.

* * * * *